(12) United States Patent
Rosselli et al.

(10) Patent No.: US 7,454,478 B1
(45) Date of Patent: Nov. 18, 2008

(54) BUSINESS MESSAGE TRACKING SYSTEM USING MESSAGE QUEUES AND TRACKING QUEUE FOR TRACKING TRANSACTION MESSAGES COMMUNICATED BETWEEN COMPUTERS

(75) Inventors: Viente Suarez Rosselli, Berkshire (GB); Jose Emir Garza, Surrey (GB); Stephen James Hobson, Middlesex (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/948,762

(22) Filed: Nov. 30, 2007

(51) Int. Cl.
*G06F 15/167* (2006.01)
(52) U.S. Cl. .......................... 709/214; 710/52; 711/119
(58) Field of Classification Search ......... 709/212–219, 709/206, 224, 319; 710/52–57, 5; 711/161, 711/119–120; 707/201
See application file for complete search history.

(56) References Cited

U.S. PATENT DOCUMENTS

| | | | |
|---|---|---|---|
| 5,233,654 A | | 8/1993 | Harvey et al. |
| 5,265,235 A | * | 11/1993 | Sindhu et al. ............... 711/120 |
| 5,311,438 A | | 5/1994 | Sellers et al. |
| 5,699,412 A | | 12/1997 | Polcyn |
| 5,710,889 A | | 1/1998 | Clark et al. |
| 5,832,458 A | | 11/1998 | Jones |
| 5,862,223 A | | 1/1999 | Walker et al. |
| 5,867,494 A | | 2/1999 | Krishnaswamy et al. |
| 5,995,948 A | | 11/1999 | Whitford et al. |
| 6,115,690 A | | 9/2000 | Wong |
| 6,269,399 B1 | * | 7/2001 | Dyson et al. ............... 709/224 |
| 6,341,287 B1 | | 1/2002 | Sziklai et al. |
| 6,606,744 B1 | | 8/2003 | Mikurak |
| 6,658,568 B1 | | 12/2003 | Ginter et al. |
| 6,735,636 B1 | * | 5/2004 | Mokryn et al. ............... 710/5 |
| 7,181,017 B1 | | 2/2007 | Nagel et al. |
| 7,272,815 B1 | | 9/2007 | Eldridge et al. |
| 7,299,266 B2 | * | 11/2007 | Boyd et al. ............... 709/213 |
| 2003/0037142 A1 | | 2/2003 | Munger et al. |
| 2003/0037178 A1 | * | 2/2003 | Vessey et al. ............... 709/319 |
| 2003/0069779 A1 | | 4/2003 | Menninger et al. |

(Continued)

OTHER PUBLICATIONS

Jerry Gao, Ph.D., et al., "Tracking Component-Based Software", San Jose State University: pp. 1-10, no date.

(Continued)

*Primary Examiner*—Le Luu
(74) *Attorney, Agent, or Firm*—Scully, Scott, Murphy & Presser, P.C.; Bruce Clay, Esq.

(57) ABSTRACT

A tracking system includes a business system using a plurality of application modules each including a computer for processing a transaction including a plurality of steps. A messaging system includes a messaging computer program embodied in a computer readable medium in each of the computers for communicating between the computers. The messaging system generates queues of messages being communicated between the computers. The messaging system can be configured by an administrator to generate tracking data about the messages being communicated between the computers. A tracking module is included in one of the computers, and has the messaging computer program and a tracking computer program embodied in the computer readable medium for specifying status data for retrieval from the messaging queues, receiving the status data from the messaging queues into a tracking queue, and storing the status data in a data storage system.

2 Claims, 1 Drawing Sheet

U.S. PATENT DOCUMENTS

| | | | |
|---|---|---|---|
| 2003/0177321 A1* | 9/2003 | Watanabe | 711/161 |
| 2007/0061379 A1* | 3/2007 | Wong et al. | 707/201 |
| 2007/0073821 A1* | 3/2007 | Brail | 709/206 |
| 2007/0179811 A1 | 8/2007 | Reiner | |

OTHER PUBLICATIONS

A. Sahai, et al., "Message Tracking in SOAP-Based Web Services", Hewlett-Packard Laboratories, Palo Alto, 2002.

Dominique N. Godard, Self-Recovering Equalization and Carrier Tracking in Two-Dimension Data Communications Systems, IEEE Transactions on Communications, vol. Com.-28, No. 11, Nov. 1980: pp. 1867-1875.

Jeffrey K. Hollingsworth, Member, IEEE Computer Society, "Critical Path Profiling of Message Passing and Shared-Memory Programs", IEEE Transactions on Parallel and Distributed Systems, vol. 9, No. 10, Oct. 1998: pp. 1029-1039.

Sashi Lazar, et al., "A Scalable Location Tracking and Message Delivery Scheme for Mobile Agents", Maryland Center for Telecommunications Research, Dept. of Computer Science and Electrical Engineering, no date.

Dennis Quan, et al., "A Unified Abstraction for Messaging on the Semantic Web", MIT AI Laboratory/LCS, 200 Technology Square, Cambridge, MA, (WWW May 20-24, 2003, Budapest, Hungary).

D. L. Burkes, et al., "Design Approaches for Real-Time Transaction Processing Remote", Data Base Technology Institute, IBM Almaden Research Center: pp. 568-572, 1990.

* cited by examiner

BUSINESS MESSAGE TRACKING SYSTEM USING MESSAGE QUEUES AND TRACKING QUEUE FOR TRACKING TRANSACTION MESSAGES COMMUNICATED BETWEEN COMPUTERS

FIELD OF THE INVENTION

The present invention relates to a tracking system and method for a business system, and more specifically, relates to tracking data over a plurality of steps in a business system using a messaging system.

BACKGROUND OF THE INVENTION

A typical business system may include many transaction steps. The business system may also require messages be sent to different application modules within the business system. A messaging system may be used to communicate the messages to the different application modules. For example, a financial institution may use such a business system as described above which may include a payment request requiring multiple steps before the transaction is complete. One problem with current business systems, including payment requests from a financial institution, is the tracking of the transaction.

For example, when a payment request is received by a financial business system it will be submitted to a complex business process flow where the message is validated, approved, scheduled for later processing, processed and completion acknowledged to the requester. Financial institutions require tracking the movement of payment requests throughout the process.

One solution to implementing message tracking between application modules includes generating duplicate messages with state information to feed a tracking application. Another solution includes application modules generating duplicate messages and requesting messaging software to generate report messages with state information to feed a tracking application. However, one drawback to these solutions is that application modules must be aware of the tracking process and has to include computer code to request the reports or to make copies of the data for the tracking application which is invasive to the business system. Another drawback to known solutions is that the application modules need to request messaging software to generate report messages that feed the tracking application, and thus other processing is interrupted. Alternatively, the application module could interrupt the messaging software to request generation of a report message, however, this is also undesirable because the messaging software is interrupted from other processing.

Therefore, a need exists for a tracking system which is minimally invasive to existing application modules and messaging systems.

SUMMARY OF THE INVENTION

In an aspect of the invention, a tracking system includes a business system using a plurality of application modules each including a computer for processing a transaction having a plurality of steps. A messaging system includes a messaging computer program embodied in a computer readable medium in each of the computers for communicating between the computers. Further, the messaging system manages queues of messages being communicated between the computers. A tracking module is included in one of the computers and the tracking module has the messaging computer program and a tracking computer program embodied in the computer readable medium. The tracking module specifies status data for retrieval from the messaging queues, receives the status data from the messaging queues into a tracking queue, and may store the status data in a data storage system.

In another aspect of the invention, a method for tracking transaction steps using a messaging system includes: providing a business transaction including a plurality of transaction steps having application modules; messaging between the application modules at each step of the business transaction; queuing data from each message; determining properties of status data for extraction from the message queues; extracting status data from the message queues having the determined properties; queuing the status data; sending the status data to a processing module; evaluating the status data; and communicating the status data of messages. Alternatively, the method may include the step of storing the status data.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
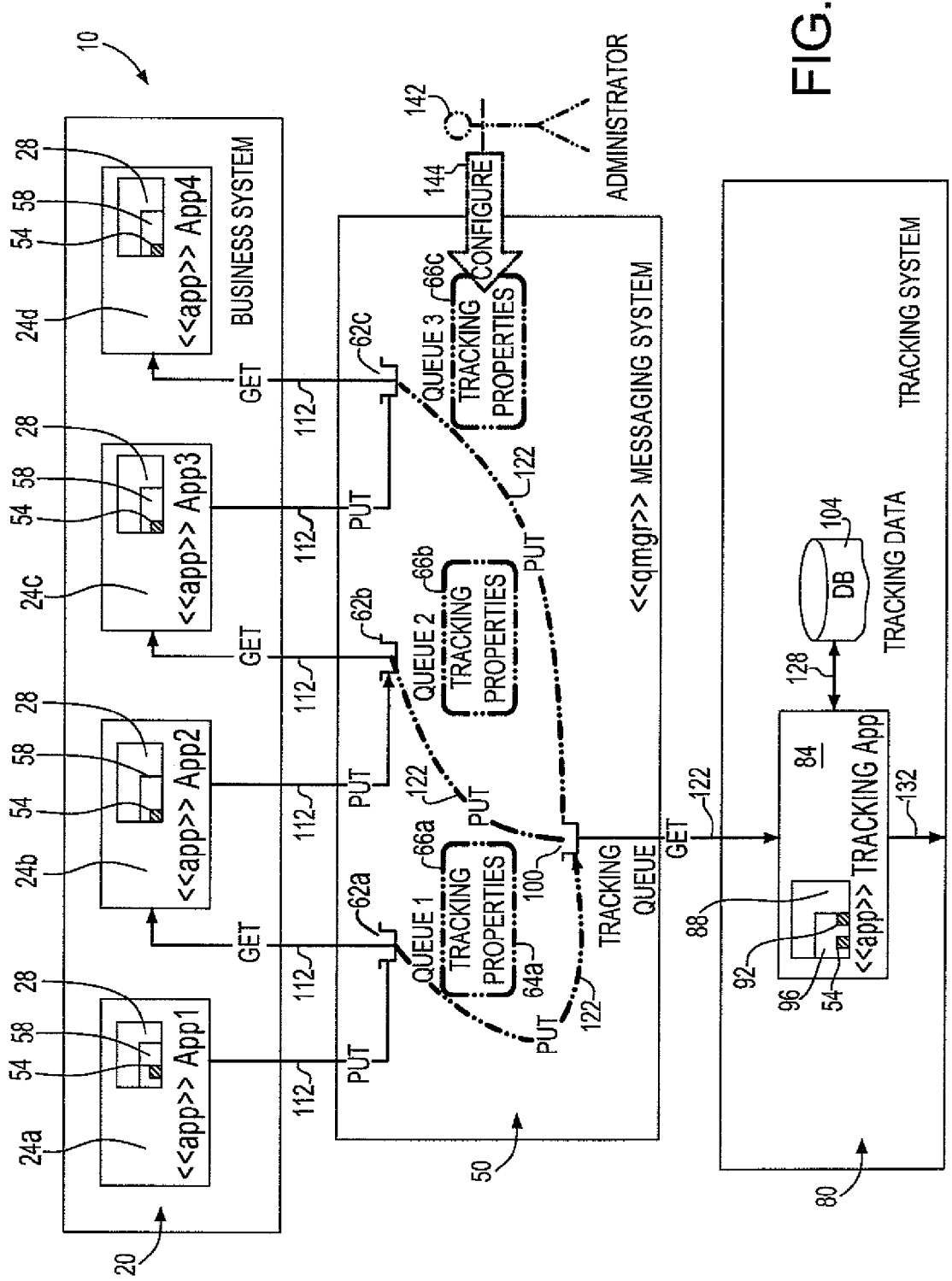
FIG. 1 is a block diagram of the tracking system for tracking status data in a messaging system used by a business system.

An exemplary embodiment of a business message tracking system and method 10 according to the present invention is shown in FIG. 1. The business message tracking system 10 includes a business system 20 using a plurality of discrete application modules 24a-24d each including a computer 28, respectively, for processing a transaction which includes a plurality of steps. For example, a business system may include a financial transaction requiring processing steps which include the multiple discrete application modules 24a-24d to complete the transaction. The number of steps may vary with each transaction. The application modules 24a-24d are interconnected by, inter alia, a messaging system 50. The application modules 24a-24d exchange business data using messages 112 via queues 62a-62c in the messaging system 50. Queues are objects that reside in instances of the messaging system. A sequence or arrangement of data or messages can be in the queue, or, for example, a queue may be empty of data or messages.

The messaging system 50 includes a messaging computer program 54 embodied in a computer readable medium 58 respectively in each of the computers 28, respectively, for communicating between the computers 28. The messaging system 50 may be a middleware system that provides messaging services to business applications. The invention, inter ala, adds functionality to the messaging system to enable message tracking. The messaging system 50 manages queues of messages 62a-62c which are communicated between the computers 28. More specifically, messages 112 are generated by application modules 24a-24d and during their transmission are queued in queues 62a-62c. The message 112 is received by its destination application module from its respective queue. Thus, message queue 62a captures or receives messages between application modules 24a and 24b, message queue 62b captures or receives messages between application modules 24b and 24c, and message queue 62c captures or receives messages between application modules 24c and 24d.

A tracking system 80 is a business system which includes a tracking module 84 including a tracking computer 88. The tracking computer 88 further includes the messaging computer program 54 and a tracking computer program 92 embodied in a computer readable medium 96 in the tracking computer 88. The tracking system 80 manages the process of business transactions by collecting messages that describe the transaction status and stores the status data in a database 104 to provide a history of the transaction. Alternatively, the tracking system 80 may not store status data in the database 104, for example, the status data may be used and deleted, or the status data may be temporarily stored in another medium. The tracking module 84 uses the tracking computer program 92 in the tracking computer 88 for specifying status data or tracking messages 122 for retrieval from the message queues 62a-62c. A tracking queue 100 receives the status data 122 from the message queues 62a-62c, and the tracking application 84 receives the status data 122 from the tracking queue 100 for storing the status data 122 in a data storage system embodied as a database 104 using a data link 128 to provide a history of a plurality of transactions. The status data 122 may include all or a portion of a tracked message.

In operation, the system and method for tracking transaction steps 10 includes providing a business transaction according to a business system 20. The business transaction includes a plurality of transaction steps embodied as application modules 24a-24d. Messaging occurs between the application modules 24a-24d at each step of the business transaction. The messages 112 include data about a transaction and the messages 112 enter and exit queues 62a-62c during sending of the message. The tracking module 80 includes a computer program 92 for determining tracking properties of status data 122. The computer program 92 uses the messaging system, i.e., modifies the messaging system, to implement the tracking properties of the status data 122 by extracting the status data from the message queues 62a-62c. Thus, the status data 122 is extracted which meets the determined or specified tracking properties. An administrator 142 of the messaging system 50 may configure 144 the tracking properties using an input device such as a keyboard to a computer running the messaging software. The administrator 142 can set properties for a tracking message 122 derived from messages 112 wherein the properties are associated with a specific queue, for example 62a-62c (or message destination), or set the same properties for all queues. The properties include, for example, parameters for determining if tracking is required, and if so, setting further parameters for which transactions to track and/or which messages to track for particular transactions. Further properties may include, specification for determining contents of the message 122 to trigger tracking, which may include determining the destination of the message. The administrator 142 can also set properties to determine the contents of a tracking message 122 as well as the format, and the timing in generating a tracking message 122, and a destination code to enable the tracking message 122 to be sent to the tracking queue 100. The tracking message 122, containing its information about the tracked message 112, is entered into the tracking queue 100, and may be a copy, subset, or modified version of the original message 112 that arrived at the queue 62a-62c.

The status data 122 is queued in the tracking queue 100. The tracking application 84 receives the status data 122 from the tracking queue 100 for processing using the computer 88 and for storage in the database 104. The stored status data 122 can be evaluated using the computer 88 and communicated 132 to other modules or applications or used to generate reports.

Thus, the present invention enables the tracking system to be configured, for example, using a messaging system without impacting the applications that use the messaging system. Further, the application programs 24a-24d do not require changes to support message tracking. Another advantage of the tracking application includes the ease of the administrator changing commands, as well as, the ability to enable and disable the tracking software without impacting the application. Thereby, the invention provides a non invasive message tracking mechanism that enables users of messaging software, such as IBM®'s WebSphere® MQ to receive reports (tracking data) about messages as they travel across a messaging network of queue managers, queues, or both.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A business message tracking system, comprising:
   a business system using a plurality of application modules each including a computer for processing a transaction having a plurality of steps;
   a messaging system including a messaging computer program embodied in a computer readable storage medium in each of the computers for communicating between the computers, and the messaging system managing queues of messages being communicated between the computers; and
   a tracking module including a tracking computer and the tracking module having the messaging computer program and a tracking computer program embodied in the computer readable storage medium for specifying status data for retrieval from the messaging queues, and receiving the status data from the messaging queues into a tracking queue based on tracking properties.

2. A method for tracking transaction steps using a messaging system and a tracking system, comprising:
   providing a business transaction including a plurality of transaction steps having application modules each including a computer;
   messaging between the application modules at each step of the business transaction for communicating between the computers;
   queuing data from each message communicated between the computers into massage queues;
   determining tracking properties of status data for extraction from the message queues;
   extracting status data from the message queues having the determined tracking properties;
   queuing the status data into a tracking queue;
   sending the status data to a processing module;
   evaluating the status data using the tracking system; and
   communicating the status data of the messages to other systems.

* * * * *